United States Patent
Lu et al.

(10) Patent No.: US 11,800,492 B2
(45) Date of Patent: *Oct. 24, 2023

(54) METHOD AND APPARATUS FOR PROVIDING RADIO RESOURCE INFORMATION FOR SIDELINK CONTROL

(71) Applicant: ZTE Corporation, Guangdong (CN)

(72) Inventors: Youxiong Lu, Shenzhen (CN); Jin Yang, Shenzhen (CN); Shuanghong Huang, Shenzhen (CN)

(73) Assignee: ZTE Corporation, Guangdong (CN)

(*) Notice: Subject to any disclaimer, the term of this patent is extended or adjusted under 35 U.S.C. 154(b) by 7 days.

This patent is subject to a terminal disclaimer.

(21) Appl. No.: 17/502,930

(22) Filed: Oct. 15, 2021

(65) Prior Publication Data

US 2022/0039066 A1 Feb. 3, 2022

Related U.S. Application Data

(63) Continuation of application No. 16/788,266, filed on Feb. 11, 2020, now Pat. No. 11,153,851, which is a
(Continued)

(51) Int. Cl.
*H04W 72/02* (2009.01)
*H04W 76/11* (2018.01)
(Continued)

(52) U.S. Cl.
CPC ....... *H04W 72/02* (2013.01); *H04W 72/0446* (2013.01); *H04W 72/0466* (2013.01);
(Continued)

(58) Field of Classification Search
CPC ........... H04W 72/121; H04W 72/0446; H04W 72/042; H04W 72/02; H04W 92/18;
(Continued)

(56) References Cited

U.S. PATENT DOCUMENTS

| | | | |
|---|---|---|---|
| 7,801,521 B2 * | 9/2010 | Dent | H04B 7/18506 455/430 |
| 10,531,435 B2 | 1/2020 | Luo et al. | |

(Continued)

FOREIGN PATENT DOCUMENTS

| | | |
|---|---|---|
| CN | 102378387 A | 3/2012 |
| CN | 105992364 A | 10/2016 |

(Continued)

OTHER PUBLICATIONS

CNIPA, Chinese Rejection Decision for Chinese Patent Application No. 201780093872.9, dated Dec. 13, 2022, 11 pages with unofficial translation.

(Continued)

*Primary Examiner* — Wei Zhao
(74) *Attorney, Agent, or Firm* — Perkins Coie LLP

(57) ABSTRACT

A communication method, comprising: transmitting from a base station to a mobile station a first message which includes resource information corresponding to one or more resource pools, wherein the resource information identifies at least one sub-frame and at least one resource block within the at least one sub-frame, transmitting to the mobile station an indicator of one or more designated resource pools and designated resources from within the one or more designated resource pools such that the mobile station is permitted to communicate with a wireless device in communication with the mobile station via a wireless link using the one or more designated resources within the one or more designated resource pools.

15 Claims, 10 Drawing Sheets

Related U.S. Application Data continuation of application No. PCT/CN2017/097236, filed on Aug. 11, 2017.

(51) Int. Cl.
*H04W 72/0446* (2023.01)
*H04W 72/044* (2023.01)
*H04W 72/23* (2023.01)
*H04W 92/18* (2009.01)

(52) U.S. Cl.
CPC ............ *H04W 72/23* (2023.01); *H04W 76/11* (2018.02); *H04W 92/18* (2013.01)

(58) Field of Classification Search
CPC ..... H04W 76/11; H04W 88/02; H04W 72/12; H04W 72/044; H04L 5/0057; H04L 5/0051

See application file for complete search history.

(56) References Cited

U.S. PATENT DOCUMENTS

| | | | |
|---|---|---|---|
| 10,638,486 | B2 | 4/2020 | Luo et al. |
| 2016/0285932 | A1 | 9/2016 | Thyamagundalu et al. |
| 2016/0295624 | A1 | 10/2016 | Novlan et al. |
| 2016/0302249 | A1 | 10/2016 | Sheng |
| 2017/0142766 | A1 | 5/2017 | Kim |
| 2017/0208568 | A1* | 7/2017 | Nam ..................... H04W 72/23 |
| 2017/0238260 | A1 | 8/2017 | Kim et al. |
| 2017/0245313 | A1 | 8/2017 | Kim et al. |
| 2018/0206132 | A1* | 7/2018 | Guo ..................... H04B 7/0695 |
| 2020/0092685 | A1 | 3/2020 | Fehrenbach et al. |
| 2020/0119895 | A1 | 4/2020 | Choi et al. |
| 2020/0187163 | A1 | 6/2020 | Lu et al. |
| 2020/0187236 | A1 | 6/2020 | Moon et al. |

FOREIGN PATENT DOCUMENTS

| | | |
|---|---|---|
| CN | 106211332 A | 12/2016 |
| CN | 106797530 A | 5/2017 |
| EP | 2991428 A1 | 3/2016 |
| EP | 3 413 645 A1 | 12/2018 |
| WO | 2016/028059 A1 | 2/2016 |
| WO | 2016/163747 A1 | 10/2016 |
| WO | 2017/024586 A1 | 2/2017 |
| WO | 2017/052103 A1 | 3/2017 |
| WO | 2017/135428 A1 | 8/2017 |

OTHER PUBLICATIONS

Chinese Office Action dated Feb. 14, 2022 for Chinese Patent Application No. 201780093872.9 filed on Aug. 11, 2017 (13 pages).
International Search Report and Written Opinion dated May 10, 2018 for International Application No. PCT/CN2017/097236, filed on Aug. 11, 2017 (6 pages).
Intel Corporation, "Corrections to stage 2 description of ProSe," 3GPP TSG-RAN WG2 Meeting #89, Athens, Greece, R2-150645, 15 pages, Feb. 2015.
Extended European Search Report for European Patent Application No. 17921139.6, dated Jul. 9, 2020.
ZTE et al., "Details of reserved subframe allocation for V2X resource pool," 3GPP TSG RAN WG1 Meeting #88, Athens, Greece, R1-1701623, Feb. 2017.
ITL, "Remaining details on subframe pool configuration for V2V," 3GPP TSG RAN WG1 Meeting #88, Athens, Greece, R1-1703419, Feb. 2017.
"UE procedures related to Sidelink," 3GPP TS 36.213 V14.1.0 (Dec. 2016).
ZTE et al., "Discussion on Uu based resource allocation/configuration for NR V2X," 3GPP TSG RAN WG1 Meeting #96, Athens, Greece, R1-1901879, 4 pages, Feb. 2019.
"Multiplexing and channel coding," 3GPP TS 38.212 V16.2.0 (Jun. 2020).
"Radio Resource Control (RRC) protocol specification," 3GPP TS 38.331 V16.3.0 (Dec. 2020).
"Physical layer procedures for data," 3GPP TS 38.214 V16.2.0 (Jul. 2020).
"Physical channels and modulation," 3GPP TS 38.211 V16.2.0 (Jul. 2020).
"E-UTRA;Radio Resource Control (RRC); Protocol specification," 3GPP TS 36.331 V16.2.0 (Sep. 2020) (uploaded Oct. 2020).
"Medium Access Control (MAC) protocol specification," 3GPP TS 38.321 V16.2.0 (Sep. 2020) (uploaded Oct. 2020).
Communication pursuant to Article 94(3) EPC dated Nov. 29, 2021 for European Patent Application No. 17921139.6, filed on Aug. 11, 2017. (9 pages).
Intellectual Property Office of Singapore, Search Report and Written Opinion dated Jul. 1, 2022 for Singapore Patent Application No. 11202102054X, 7 pages.
EPO, Communication pursuant to Article 94(3) EPC for European Application No. 17921139.6, dated May 31, 2023, 7 pages.
3GPP, LTE; Evolved Universal Terrestrial Radio Access (E-UTRA); Physical layer procedures, 3GPP TS 36.213 version 14.2.0 Release 14, 2017, pp. 1-455.

* cited by examiner

METHOD AND APPARATUS FOR PROVIDING RADIO RESOURCE INFORMATION FOR SIDELINK CONTROL

CROSS REFERENCE TO RELATED APPLICATIONS

This patent document is a continuation of and claims benefit of priority to U.S. patent application Ser. No. 16/788,266, filed Feb. 11, 2020, which is a continuation of International Patent Application No. PCT/CN2017/097236, filed on Aug. 11, 2017. The entire content of the before-mentioned patent applications is incorporated by reference as part of the disclosure of this application.

TECHNICAL FIELD

This disclosure is directed generally to digital wireless communications.

BACKGROUND

Mobile communication technologies are moving the world toward an increasingly connected and networked society. The rapid growth of mobile communications and advances in technology has led to greater demand for capacity and peak data rates. Other aspects, such as energy consumption, device cost, spectral efficiency, cost per delivered bit, throughput, proximity services, and latency are also important to meeting the needs of various applications based on mobile communications. In comparison with the existing wireless networks, next generation systems and wireless communication techniques may need to support a much wider range of use-case characteristics and provide a much more complex range of access requirements and flexibilities.

SUMMARY

This disclosure relates to methods, systems, and devices for improved sidelink communication resource utilization by transmitting from a base station to a mobile station supporting proximity services (ProSe) in connection with a mobile station with one or more other mobile or other wireless devices operating in network scheduled mode an indicator that designates the allowable resource pools and resources (e.g. the allowable sub-frames and resource blocks) within that resource pool that the mobile station is permitted to use in a sidelink channel to communicate with another wireless device. A sidelink is a generic wireless communication link between wireless communication devices such as described in the LTE wireless standards.

In one exemplary aspect, a wireless communication method is disclosed. The method comprises transmitting from a base station to a mobile station a first message which includes resource information corresponding to one or more resource pools, wherein the resource information identifies at least one sub-frame and at least one resource block within the at least one sub-frame, transmitting to the mobile station an indicator of one or more designated resource pools and designated resources from within the one or more designated resource pools such that the mobile station is permitted to communicate with a wireless device in communication with the mobile station via a sidelink using the one or more designated resources within the one or more designated resource pools.

In another exemplary aspect, a wireless communication method is disclosed. The method comprises transmitting from a base station to a mobile station a first message which includes resource information corresponding to one or more resource pools, wherein the resource information identifies at least one sub-frame and at least one resource block within the at least one sub-frame, transmitting to the mobile station an explicit indicator of one or more designated resource pools and designated resources from within the one or more designated resource pools such that the mobile station is permitted to communicate with a wireless device in communication with the mobile station via a sidelink using the one or more designated resources within the one or more designated resource pools.

In another exemplary aspect, a wireless communication method is disclosed. The method comprises transmitting from a base station to a mobile station a first message which includes resource information corresponding to one or more resource pools, wherein the resource information identifies at least one sub-frame and at least one resource block within the at least one sub-frame, transmitting to the mobile station an implicit indicator of one or more designated resource pools and designated resources from within the one or more designated resource pools such that the mobile station is permitted to communicate with a wireless device in communication with the mobile station via a sidelink using the one or more designated resources within the one or more designated resource pools.

In another exemplary aspect, a wireless communication method is disclosed. The method comprises transmitting from a base station to a mobile station a first message which includes resource information corresponding to one or more resource pools, wherein the resource information identifies at least one sub-frame and at least one resource block within the at least one sub-frame, transmitting to the mobile station an explicit indicator, in the form of an information data field in the downlink control information (DCI), of one or more designated resource pools and designated resources from within the one or more designated resource pools such that the mobile station is permitted to communicate with a wireless device in communication with the mobile station via a sidelink using the one or more designated resources within the one or more designated resource pools.

In another exemplary aspect, a wireless communication method is disclosed. The method comprises transmitting from a base station to a mobile station a first message which includes resource information corresponding to one or more resource pools, wherein the resource information identifies at least one sub-frame and at least one resource block within the at least one sub-frame, transmitting to the mobile station an implicit indicator, in the form of a scrambling operation, of one or more designated resource pools and designated resources from within the one or more designated resource pools such that the mobile station is permitted to communicate with a wireless device in communication with the mobile station via a sidelink using the one or more designated resources within the one or more designated resource pools.

In another exemplary aspect, a wireless communication method is disclosed. The method comprises transmitting from a base station to a mobile station a first message which includes resource information corresponding to one or more resource pools, wherein the resource information identifies at least one sub-frame and at least one resource block within the at least one sub-frame, transmitting to the mobile station an implicit indicator, in the form of the downlink control information (DCI) location within the frame, of one or more designated resource pools and designated resources from within the one or more designated resource pools such that the mobile station is permitted to communicate with a wireless device in communication with the mobile station via a sidelink using the one or more designated resources within the one or more designated resource pools.

In another exemplary aspect, a wireless communication method is disclosed. The method comprises transmitting from a base station to a mobile station a first message which includes resource information corresponding to one or more resource pools, wherein the resource information identifies at least one sub-frame and at least one resource block within the at least one sub-frame, transmitting to the mobile station an implicit indicator of one or more designated resource pools and designated resources from within the one or more designated resource pools such that the mobile station is permitted to communicate with a wireless device in communication with the mobile station via a sidelink using the one or more designated resources within the one or more designated resource pools, wherein the mapping between the indicator and the resource pool is known.

In another exemplary aspect, a wireless communication method is disclosed. The method comprises transmitting from a base station to a mobile station a first message which includes resource information corresponding to one or more resource pools, wherein the resource information identifies at least one sub-frame and at least one resource block within the at least one sub-frame, transmitting to the mobile station an implicit indicator of one or more designated resource pools and designated resources from within the one or more designated resource pools such that the mobile station is permitted to communicate with a wireless device in communication with the mobile station via a sidelink using the one or more designated resources within the one or more designated resource pools, wherein the mapping between the indicator and the resource pool is signaled via a message.

In one exemplary aspect, a wireless communication method is disclosed. The method comprises receiving, at a mobile station, a first message that includes resource information corresponding to one or more resource pools, wherein the resource information identifies at least one sub-frame and at least one resource block within the at least one sub-frame, receiving, at the mobile station, an indicator of one or more designated resource pools and designated resources from within the one or more designated resource pools such that communications between the mobile station with a wireless device is permitted via a sidelink between the mobile station and the wireless device using the one or more designated resources within the one or more designated resource pools.

In another exemplary aspect, a wireless communication method is disclosed. The method comprises receiving, at a mobile station, a first message that includes resource information corresponding to one or more resource pools, wherein the resource information identifies at least one sub-frame and at least one resource block within the at least one sub-frame, receiving, at the mobile station, an explicit indicator of one or more designated resource pools and designated resources from within the one or more designated resource pools such that communications between the mobile station with a wireless device is permitted via a sidelink between the mobile station and the wireless device using the one or more designated resources within the one or more designated resource pools.

In another exemplary aspect, a wireless communication method is disclosed. The method comprises receiving, at a mobile station, a first message that includes resource information corresponding to one or more resource pools, wherein the resource information identifies at least one sub-frame and at least one resource block within the at least one sub-frame, receiving, at the mobile station, an implicit indicator of one or more designated resource pools and designated resources from within the one or more designated resource pools such that communications between the mobile station with a wireless device is permitted via a sidelink between the mobile station and the wireless device using the one or more designated resources within the one or more designated resource pools.

In another exemplary aspect, a wireless communication method is disclosed. The method comprises receiving, at a mobile station, a first message that includes resource information corresponding to one or more resource pools, wherein the resource information identifies at least one sub-frame and at least one resource block within the at least one sub-frame, receiving, at the mobile station, an explicit indicator, in the form of an information data field in the downlink control information (DCI), of one or more designated resource pools and designated resources from within the one or more designated resource pools such that communications between the mobile station with a wireless device is permitted via a sidelink between the mobile station and the wireless device using the one or more designated resources within the one or more designated resource pools.

In another exemplary aspect, a wireless communication method is disclosed. The method comprises receiving, at a mobile station, a first message that includes resource information corresponding to one or more resource pools, wherein the resource information identifies at least one sub-frame and at least one resource block within the at least one sub-frame, receiving, at the mobile station, an implicit indicator, in the form of a scrambling operation, of one or more designated resource pools and designated resources from within the one or more designated resource pools such that communications between the mobile station with a wireless device is permitted via a sidelink between the mobile station and the wireless device using the one or more designated resources within the one or more designated resource pools.

In another exemplary aspect, a wireless communication method is disclosed. The method comprises receiving, at a mobile station, a first message that includes resource information corresponding to one or more resource pools, wherein the resource information identifies at least one sub-frame and at least one resource block within the at least one sub-frame, receiving, at the mobile station, an implicit indicator, in the form of the downlink control information (DCI) location within the frame, of one or more designated resource pools and designated resources from within the one or more designated resource pools such that communications between the mobile station with a wireless device is permitted via a sidelink between the mobile station and the wireless device using the one or more designated resources within the one or more designated resource pools.

In another exemplary aspect, a wireless communication method is disclosed. The method comprises receiving, at a mobile station, a first message that includes resource information corresponding to one or more resource pools, wherein the resource information identifies at least one sub-frame and at least one resource block within the at least one sub-frame, receiving, at the mobile station, an implicit indicator of one or more designated resource pools and designated resources from within the one or more designated resource pools such that communications between the mobile station with a wireless device is permitted via a sidelink between the mobile station and the wireless device using the one or more designated resources within the one or more designated resource pools, wherein the mapping between the indicator and the resource pool is known.

In another exemplary aspect, a wireless communication method is disclosed. The method comprises receiving, at a mobile station, a first message that includes resource information corresponding to one or more resource pools, wherein the resource information identifies at least one sub-frame and at least one resource block within the at least one sub-frame, receiving, at the mobile station, an implicit indicator of one or more designated resource pools and designated resources from within the one or more designated resource pools such that communications between the mobile station with a wireless device is permitted via a sidelink between the mobile station and the wireless device using the one or more designated resources within the one or more designated resource pools, wherein the mapping between the indicator and the resource pool is signaled via a message.

In yet another exemplary aspect, a wireless communication base station is disclosed. The wireless communication base station comprises a memory that stores instructions for operations of the base station, and a processor in communication with the memory operable to execute instructions to cause the base station to: transmit in a transmission to a mobile station a first message which includes resource information corresponding to one or more resource pools, wherein the resource information identifies at least one sub-frame and at least one resource block within the at least one sub-frame, transmit in a transmission to the mobile station an indicator of one or more designated resource pools and designated resources from within the one or more designated resource pools such that the mobile station is permitted to communicate with a wireless device in communication with the mobile station via a sidelink using the one or more designated resources within the one or more designated resource pools.

In yet another exemplary aspect, a wireless communication mobile station is disclosed. The wireless communication mobile station comprises a memory that stores instructions for operations of the mobile station, and a processor in communication with the memory operable to execute instructions to cause the mobile station to: receive in a reception a first message that includes resource information corresponding to one or more resource pools, wherein the resource information identifies at least one sub-frame and at least one resource block within the at least one sub-frame, receive in a reception an indicator of one or more designated resource pools and designated resources from within the one or more designated resource pools such that communications between the mobile station with a wireless device is permitted via a sidelink between the mobile station and the wireless device using the one or more designated resources within the one or more designated resource pools.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
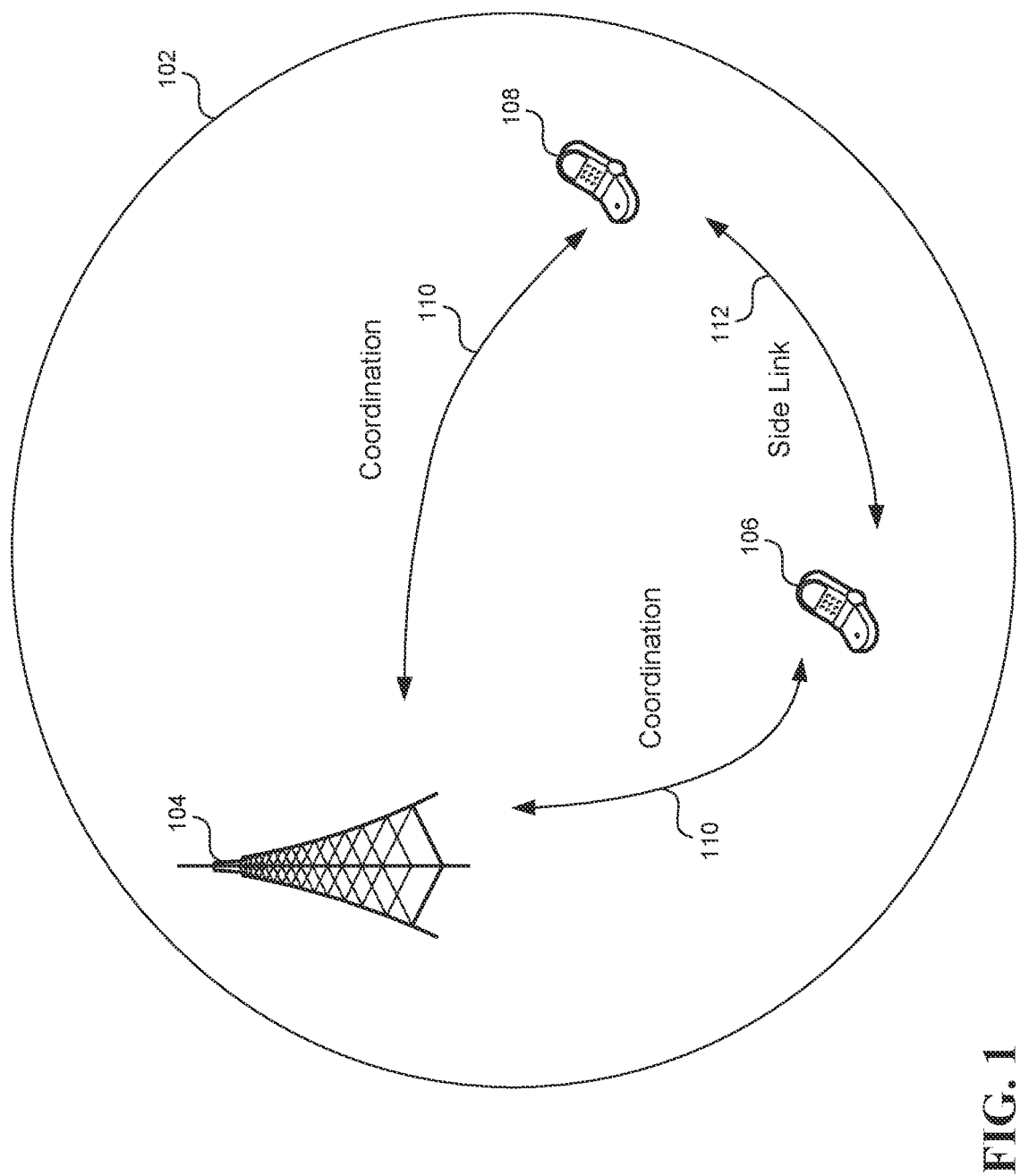
FIG. 1 shows an exemplary diagram of mobile stations (UEs) receiving coordination information from a base station (eNodeB) with the coordination information allowing the UEs to communicate with each other directly over a sidelink channel.

The technology and examples of implementations disclosed in this document can be used to improve sidelink communication resource utilization in proximity services (ProSe) based on available or allowable resource pools and resources. The term "exemplary" is used to mean "an example of" and, unless otherwise stated, does not imply an ideal or preferred embodiment.

In current 4th Generation Wireless Systems, device to device (D2D) and vehicle to everything (V2X) communication in the context of proximity services (ProSe) is a desirable feature. Utilizing cellular resources for proximity based services such as direct communication between mobile devices is currently supported via a sidelink channel between the mobile devices. Near distance communications such as D2D and V2X are attracting more attention and research. Such technologies can be applied to public safety, car networking, field command, social networking, electronic payment, location-based advertising, gaming, entertainment, enhancing network coverage and others.

D2D communication works in a variety of scenarios including when the mobile devices are within the network coverage, have partial network coverage, and lack network coverage via direct discovery. D2D communication may reduce the burden on the cellular network, improve battery life by reducing battery consumption of user equipment, improve throughput and/or peak data rates, improve the robustness of the network infrastructure without relying on network coverage, particularly in the areas of public security/safety and other special communication needs.

Vehicle based communications can be used to achieve a variety of communications such as vehicle to vehicle, vehicle to fixed roadside infrastructure such as toll booths, vehicle to pedestrian, and the like. It may also be used to communicate relevant and interesting vehicular status information such as vehicle location, speed, acceleration, travel path, and the like. It may also be used to provide current road conditions, vehicular collaboration in hazardous road conditions, provide advanced alerts of vehicle collisions or accidents, or help to prevent accidents from occurring in the first place. These and other vehicle based communications can collectively be referred to as Vehicle to Everything (V2X) Communications.

Specifically, in some implementations the sidelink channel consists of two logical channels, the sidelink traffic channel (STCH) and the sidelink broadcast control channel (SBCCH). In some implementations the STCH is used for data transmission between the ProSe mobile devices. In some implementations this may be a point-to-multipoint channel. The user data carried on the STCH is carried on the transport channel known as the sidelink shared channel (SL-SCH). In some implementations the sidelink shared channel is not necessarily collision-free. In some implementations the SL-SCH utilizes the physical sidelink shared channel (PSSCH) for over the air communication.

In some implementations the SBCCH is used for signaling information related to synchronization for ProSe based communication when the transmitting mobile is out of coverage of the network or only has partial coverage, or when the mobile devices desiring to communicate over the sidelink are in different cells. The SBCCH utilizes the sidelink broadcast channel (SL-BCH) at the transport layer and the physical sidelink broadcast channel (PSBCH) for over the air communication.

In some implementations the physical sidelink control channel (PSCCH) is utilized to transport the sidelink control information (SCI), which carries the necessary information for a mobile station to receive, demodulate, and decode the PSSCH. The PSCCH is analogous to the PDCCH.

Support for the sidelink channel is accomplished via overhead signaling utilizing the radio resource control (RRC) protocol to configure resource pools that contain resources such as the allowable sub-frames that may be used for the sidelink channel and the allowable resource blocks within those sub-frames.

In some modes of ProSe, coordination and scheduling of the sidelink communication is coordinated through the wireless network ("network scheduled mode") and communicated to the mobile device wishing to transmit data via the downlink control information (DCI) that is carried on the Physical Downlink Control Channel (PDCCH) and through dedicated RRC signaling by specifying which resource pool and which resources the transmitting mobile station is permitted to use on the scheduled sidelink communication.

In other modes of ProSe, coordination and scheduling of the sidelink communication between the mobile stations is performed autonomously and the transmitting mobile selects resources from a resource pool to use on the sidelink channel.

In some system configurations, the available resource pools in the network scheduled mode and the mobile autonomous mode may be separate and distinct. Further, in some conventional systems, a mobile station that is operating in network scheduled mode may not be able to utilize resources in other resource pools due to the signaling constraints of current conventional implementations.

Thus, it is desirable to have a system design in which a mobile device operating in network scheduled mode may utilize resources from more than one resource pool when using the sidelink channel to communicate with another mobile device.

D2D and V2X communication systems may be designed to support communications between the desired devices utilizing a sidelink based on base station communications scheduling the resources to be used. In some implementations, such as LTE release 12, when using the networked scheduled mode, the scheduled resources utilized by the mobile station for sidelink communication is limited to a single resource pool.

The current disclosure describes technology to enable a mobile station to utilize one or more resource pools to improve the efficiency, throughput, and/or peak data rates of the sidelink communication channel in future wireless networks.

In this document, examples with various levels of detail are set forth to illustrate aspects of the presently disclosed technology.

For example, when supporting a mobile station that supports ProSe, it is useful to improve the sidelink channel efficiency by allowing the mobile station to use resources that may be from more than one resource pool.

Thus, utilizing the technology disclosed, next generation wireless systems may increase the efficiency, bandwidth, and/or throughput of a sidelink communication channel through the support of allowing scheduled resources in the network scheduled mode to come from one or more resource pools.

The specifics in the described examples should not be construed as limitation on the scope of the disclosed technology or what may be claimed, but rather as descriptions of features that may or may not be specific to particular embodiments of specific disclosed technology. Certain features that are described in this document are in the context of separate embodiments may also be implemented in combination in a single embodiment. Conversely, features that are described in the context of a single embodiment may also be implemented in multiple embodiments separately or in any suitable combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this disclosure should not be understood as requiring such separation in all embodiments.

FIG. 1 shows mobile stations (UE) 106 and 108 in a wireless network in coordination communication 110 with a base station 104, with both mobile stations within the coverage zone of the base station 102, utilizing the disclosed technology to communicate via a sidelink communication channel 112.

Figure 2:
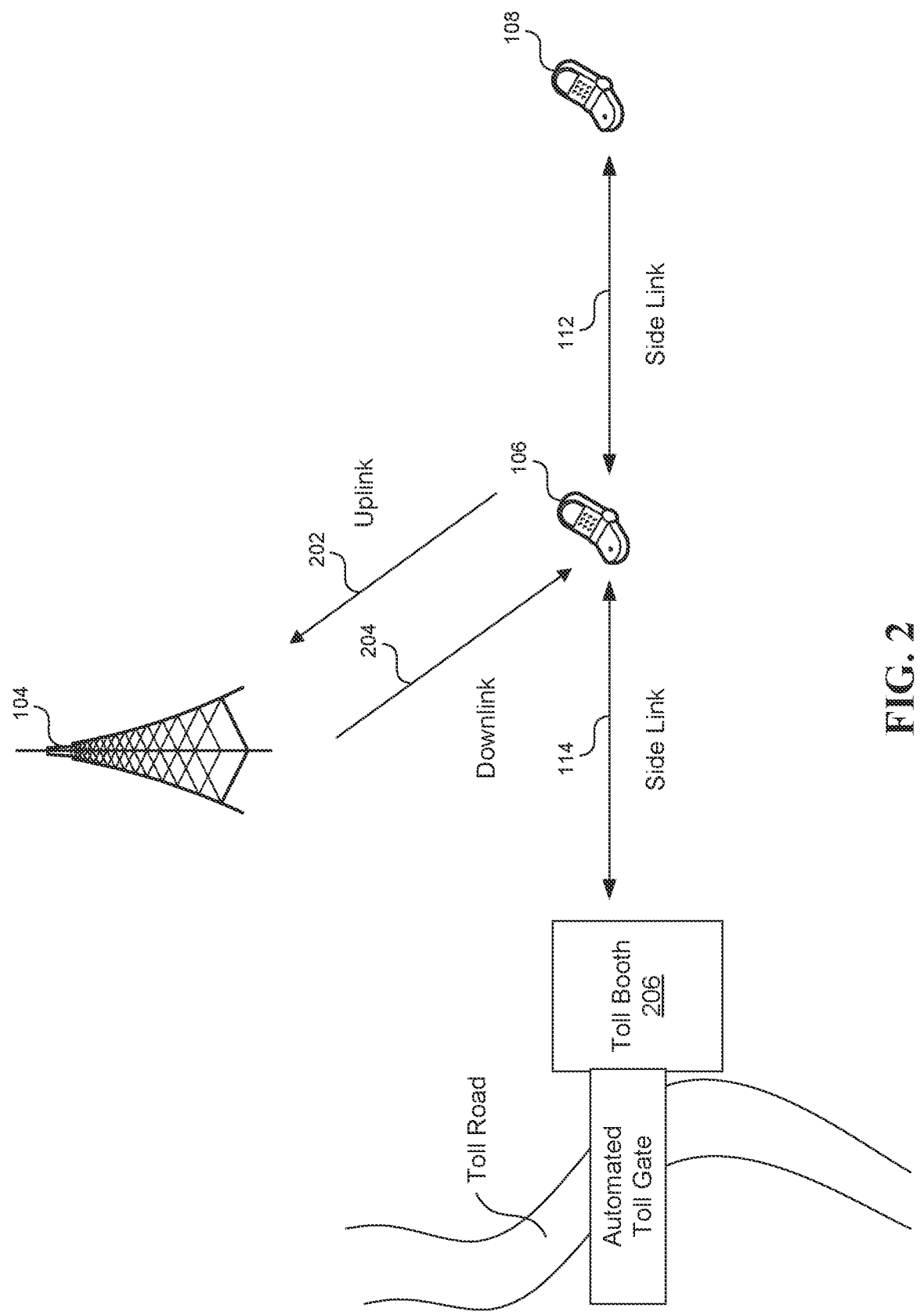
FIG. 2 shows an exemplary diagram of a mobile station (UE) in communication with a base station (eNodeB) with both downlink and uplink channels such that the UE may communicate with another UE directly over a sidelink channel or a fixed wireless infrastructure device such as a toll collection booth.

FIG. 2 shows mobile station (UE) 106 in a wireless network in communication with a base station 104, via an uplink communications channel 202, and a downlink communications channel 204, utilizing the disclosed technology to communicate via a sidelink communications channel 112 to another mobile station (UE) 108 that is not in communication with the base station 104. Additionally FIG. 2 shows mobile station (UE) 106 in a wireless network in communication with base station 104, via an uplink communications channel 202, and a downlink communications channel 204, utilizing the disclosed technology to communicate via a sidelink communications channel 114 to a fixed roadside device such as a toll collections booth 206 that is not in communication with the base station 104.

Figure 3A:
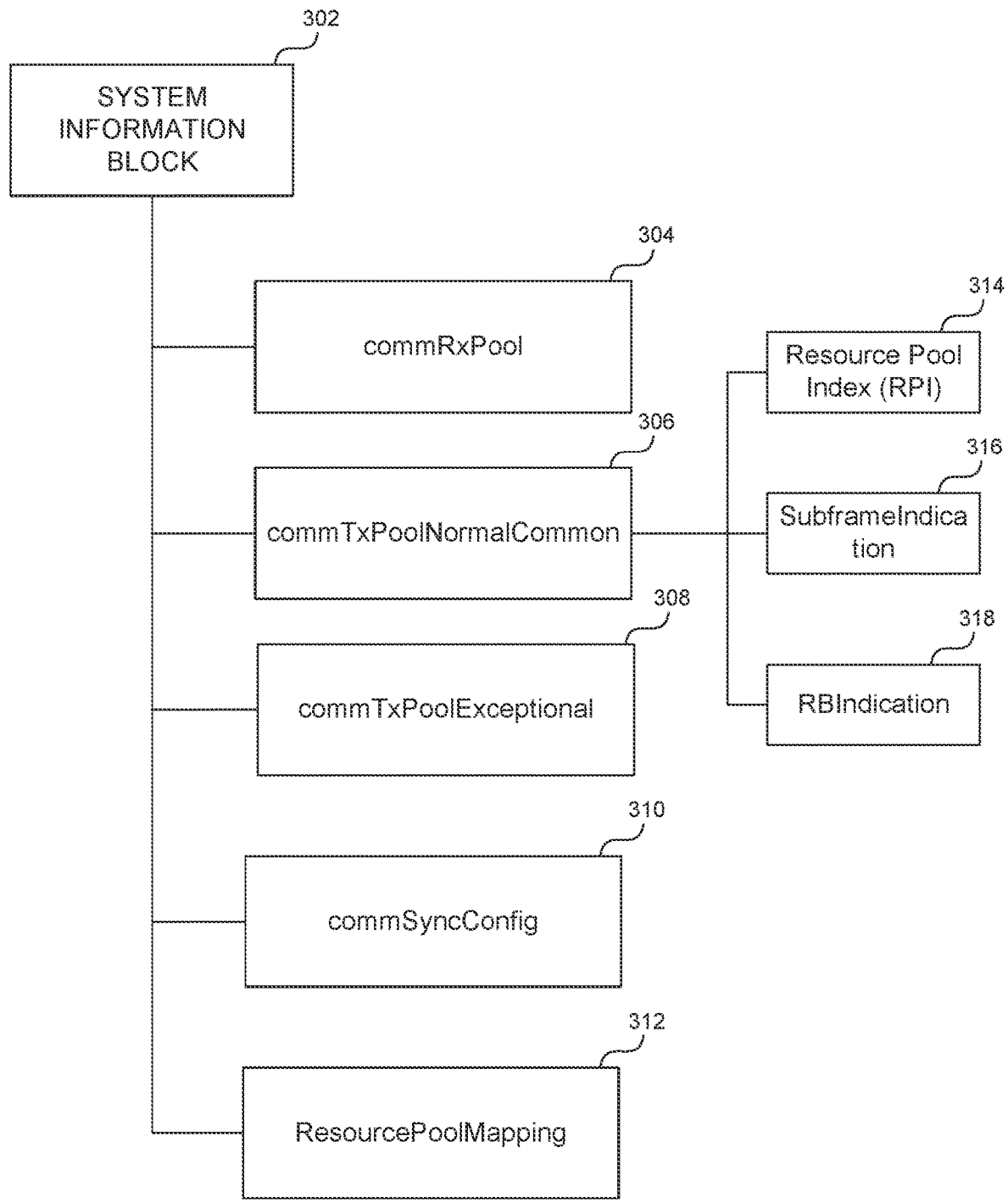
FIG. 3A shows an exemplary diagram of a system information data structure consisting of a number of information elements such as the commRxPool, commTxPoolNormalCommon, commTxPoolExceptional, commSyncConfigList, and ResourcePoolMapping, sub-information elements of the commTxPoolNormalCommon such as ResourcePoolIndex, SubframeIndication, and RBIndication, all of which are optional informational elements conveying information to support a sidelink channel.

FIG. 3A shows an example of a possible information element data structure of system information block (SIB) 302 containing information elements such as commRxPool 304, commTxPoolNormalCommon 306, commTxPoolExceptional 308, commSyncConfig 310 and ResourcePool-Mapping 312. The commTxPoolNormalCommon 306 may also include sub-information elements such as Resource-PoolIndex 314, SubframeIndication 316, and RBIndication 318 (Resource Block Indication).

These information elements may contain information to support a sidelink communications channel. For example, commRxPool 304 may include one or more resource pools and the associated resources that the UE may use for receiving a sidelink transmission. For example, commTx-PoolNormalCommon 306 may include one or more resource pools and the associated resources that the UE may use for transmission while in a certain connection states with the network. For example, commTxPoolExceptional 308 may include one or more resource pools and the associated resources that the UE may use for transmission while in a different set of connection states with the network. For example, commSyncConfig 310 may include information for synchronization between UEs which are not in the coverage of the same cell.

For example, the ResourcePoolMapping 312 may include information that identifies the parameters in the system information block that should be associated with the specified resource pool. For example the ResourcePoolMapping 312 may include the mapping from the RNTI to the resource pool. For example the ResourcePoolMapping 312 may include the mapping that identifies the DCI sub-frame location to the resource pool. For example the Resource-PoolMapping 312 may include the mapping from the scrambling code to the resource pool. For example the Resource-PoolMapping 312 may identify the described resource pool order to which the DCI is referring to such that in some cases the DCI information element Resource Pool Index (RPI) 322 of FIG. 3B need not be present. For example the Resour-cePoolMapping 312 may include the mapping from the DCI's location within the frame to the resource pool.

For example, the sub-information element Resource-PoolIndex 314 of the commTxPoolNormalCommon 306 information element may include an identifier for the described resource pool. For example, the sub-information element SubframeIndication 316 of the commTxPoolNor-malCommon 306 information element may indicate the allowable sub-frames allocated to the specified resource pool. For example, the sub-information element RBIndication 318 of the commTxPoolNormalCommon 306 information element may indicate the allowable resource blocks allocated to the specified resource pool.

In some implementations, each of the described information elements and sub-information elements may be repeated as necessary to completely communicate the system information. For example, if the network desired to configure three resource pools, then there would be a corresponding number of information elements as described above to describe the resource pools as necessary.

Figure 3B:
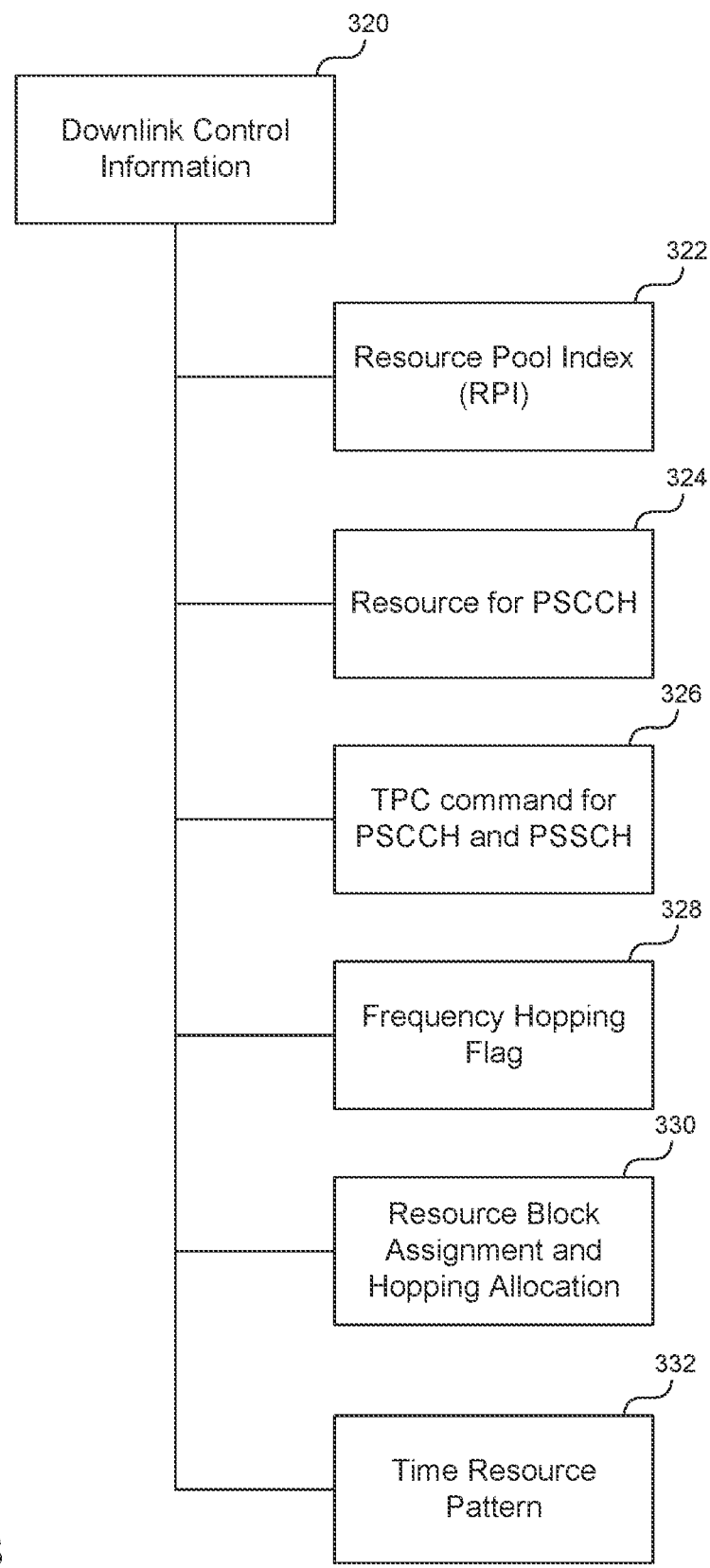
FIG. 3B shows an exemplary diagram of a downlink control information data structure consisting of a number of information elements such as the Resource Pool Index (RPI), Resource for PSCCH, the Transmit Power Control (TPC) command for PSCCH and PSSCH, the frequency hopping flag, the Resource Block Assignment and Hopping Allocation, the Time Resource Pattern, all of which are optional informational elements conveying information to support scheduling of allowable resources to be used in a sidelink channel based communications.

FIG. 3B shows an example of a possible information element data structure of downlink control information (DCI) 320 containing information elements such as Resource Pool Index (RPI) 322, Resource for PSCCH 324, Transmit Power Control (TPC) command for PSCCH and PSSCH 326, Frequency Hopping Flag 328, Resource Block Assignment and Hopping Allocation 330, and Time Resource Pattern 332. For example, a UE that receives the DCI parameters listed above with the exception of the Resource Pool Index 322 may use the provided information to transmit the sidelink control information (SCI) on the PSCCH. The resource pool index (RPI) may be used as an explicit indicator of which resource pool this DCI is referring to and scheduling the UE to use for the appropriate sidelink communications on the PSSCH.

Figure 3C:
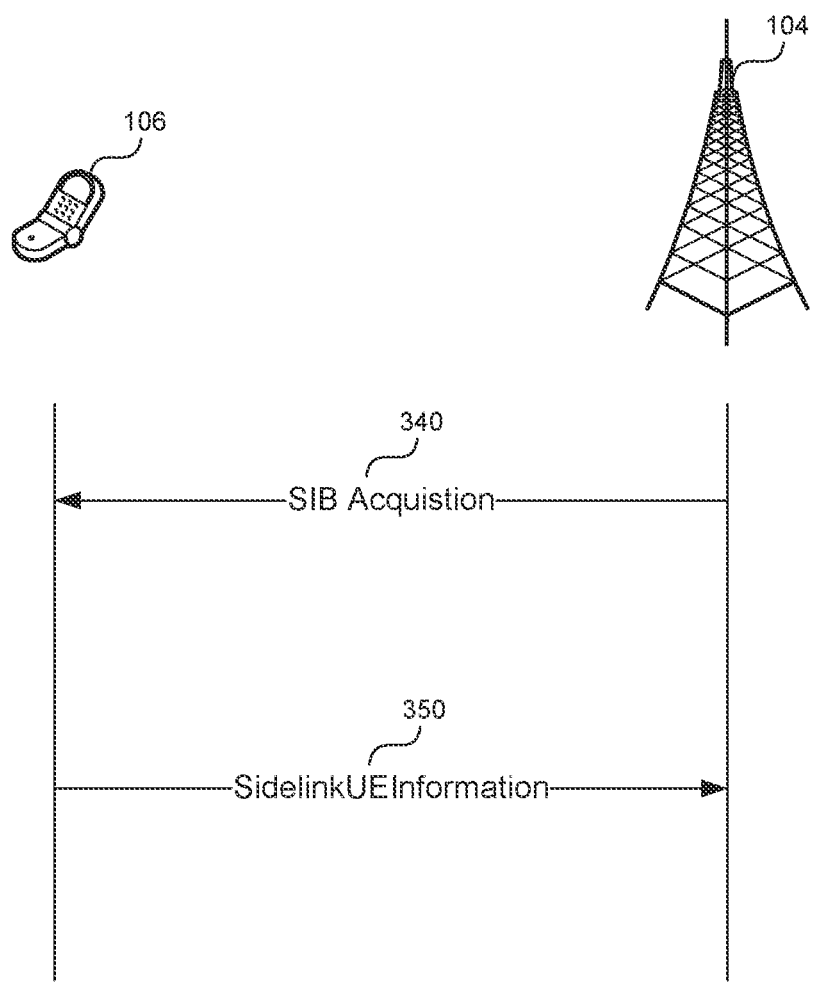
FIG. 3C shows an exemplary diagram of the message passing between the mobile station and the base station to initiate scheduled sidelink communication.

FIG. 3C shows an example of a possible message passing sequence between the base station 104 and the mobile station (UE) 106 that desires to initiate sidelink communications. After the mobile acquires the system information block (SIB) 340 associated with sidelink communication, this indicates to the UE that the base station supports sidelink communications. A UE that desires to operate in network scheduled mode may then transmit a SidelinkUE-Information message 350 to the base station 104, which contains relevant information regarding the UE's desire to transmit or receive sidelink data. In response, the base station may schedule sidelink transmissions using, for example, the resource pools described in the SIB as depicted in FIG. 3A, with an explicit indication such as the Resource Pool Index in the DCI as depicted in FIG. 3B.

Figure 4:
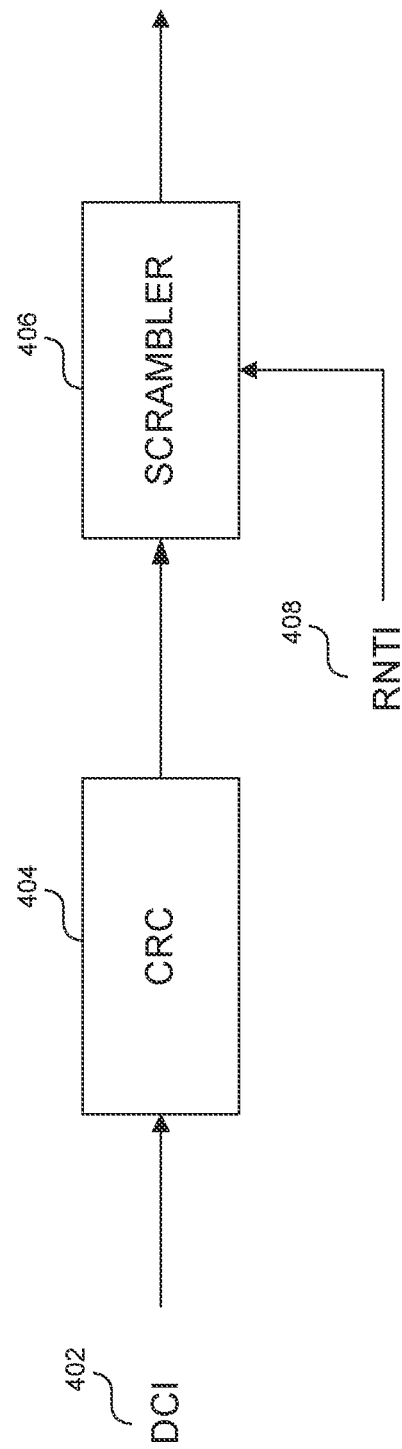
FIG. 4 shows an exemplary diagram of the downlink control indicator (DCI) information after having a cyclic redundancy check (CRC) appended, being scrambled based on the Radio Network Temporary Identifier (RNTI) providing an indication of the scheduled resource pool.

FIG. 4 shows an example of a possible implicit indicator, where the DCI information bits 402 are appended with a cyclic redundancy check (CRC) sequence 404 which is followed by a scrambler 406 with a scrambling sequence based at least in part on a Radio Network Temporary Identifier (RNTI) 408. The mobile station (UE) may be assigned more than one RNTI and the mapping between the RNTI and the associated resource pool may be known in advance or may be signaled via overhead messaging to the UE.

Figure 5:
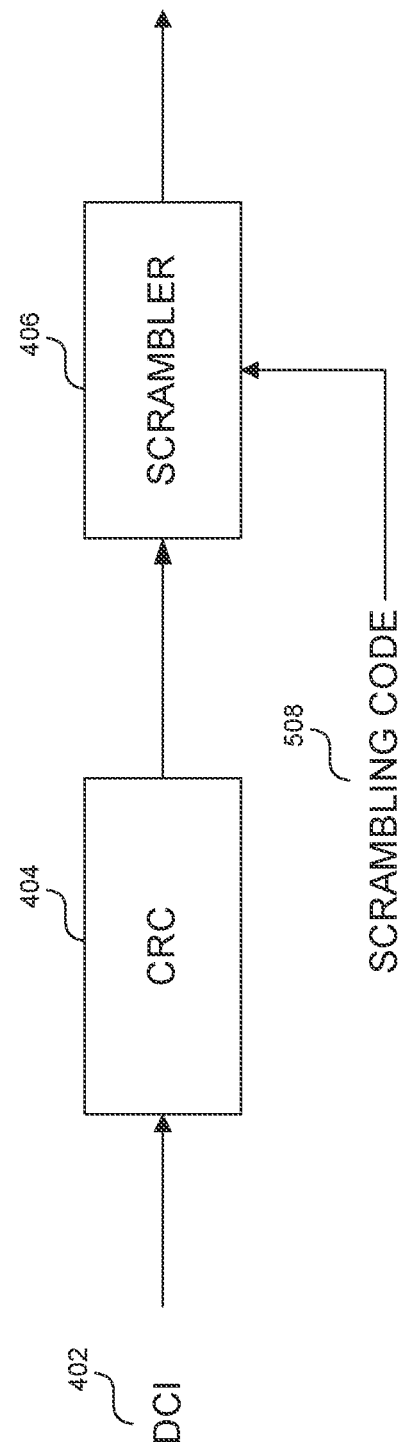
FIG. 5 shows an exemplary diagram of the downlink control indicator (DCI) information after having a cyclic redundancy check (CRC) appending, being scrambled based on a scrambling code providing an indication of the scheduled resource pool.

FIG. 5 shows an example of a possible implicit indicator, where the DCI information bits 402 are appended with a cyclic redundancy check (CRC) sequence 404 which is followed by a scrambler 406 with a scrambling sequence based at least in part on scrambling code 508 that is known at the UE. The mapping between the scrambling code and the associated resource pool may be known in advance or may be signaled via overhead messaging to the UE. The scrambling code 508 may also be signaled via overhead messaging to the UE.

Figure 6:
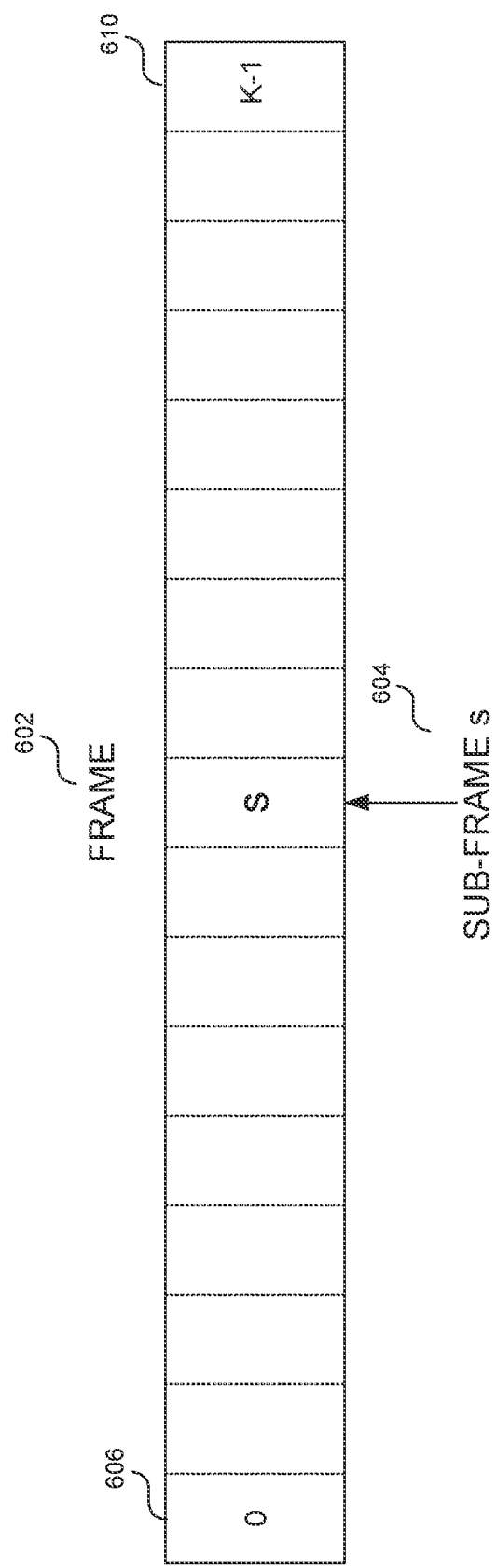
FIG. 6 shows an exemplary diagram of a downlink frame structure consisting of K sub-frames indexed from 0 to K−1.

FIG. 6 shows an example of a possible implicit indicator, the downlink control information (DCI) being transmitted in a downlink frame 602 with K sub-frames indexed from 0 to K−1 606 . . . 610, being transmitted on sub-frame s 604 may operate as the indicator. The mapping between the DCI location information within the frame may be known, preconfigured, or signaled via overhead messaging. One possible pre-configuration mapping between the DCI location and the corresponding resource pool may be i=s mod N, where i is the resource pool index, s is the DCI location within the frame, and N is the maximum number of resource pools supported by the UE for that type of resource pool. For example a UE may support a different maximum number of resource pools in the commTxPoolNormalCommon than in commTxPoolExceptional.

Figure 7:
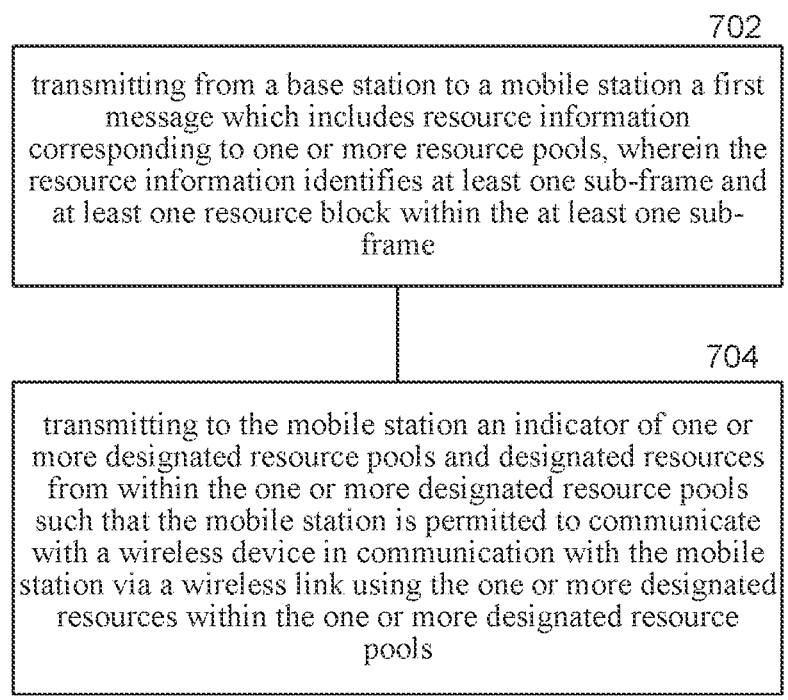
FIG. 7 shows an exemplary flowchart of an example process of wireless communications.

As illustrated in FIG. 7, in an exemplary embodiment, a wireless communication method includes: transmitting from a base station to a mobile station a first message which includes resource information corresponding to one or more resource pools, wherein the resource information identifies at least one or more sub-frames and at least one or more resource blocks within the one or more sub-frames, transmitting to the mobile station an indicator of one or more designated resource pools and designated resources from within the one or more designated resource pools such that the mobile station is permitted to communicate with a wireless device in communication with the mobile station via a sidelink using the one or more designated resources within the one or more designated resource pools.

Figure 8:
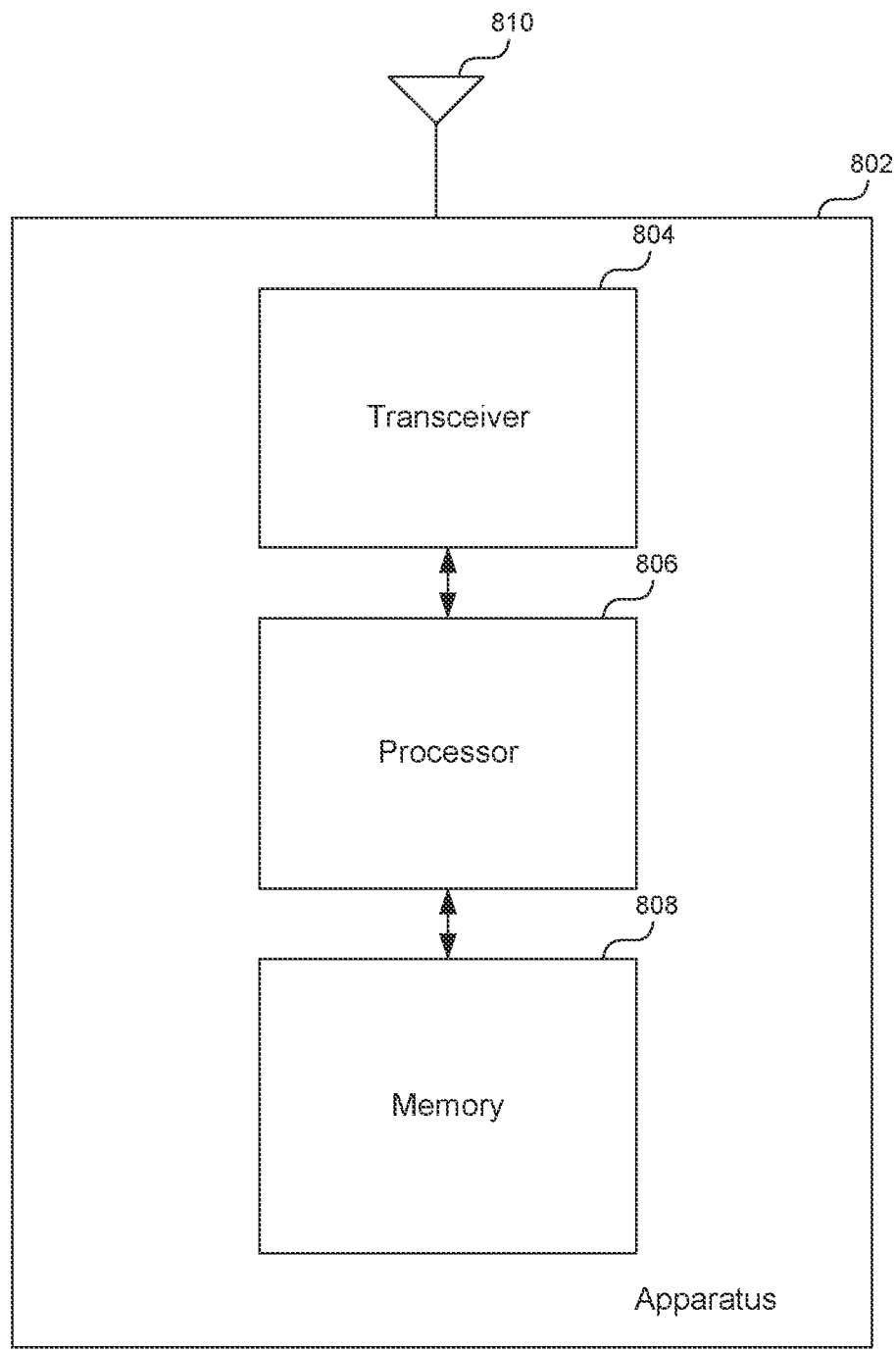
FIG. 8 shows an exemplary apparatus that may implement any of the methods described in the presently disclosed technology.

FIG. 8 shows an example apparatus 802 containing a transceiver 804, a processor, 806, memory 808, and an antenna 810 that may be used to implement the methods described in the present document.

In some embodiments, the indicator that designates the one or more resource pools may be explicit. In other embodiments the indicator that designates the one or more resource pools may be implicit. In some embodiments the indicator that designates the one or more resource pools may be an information field within the downlink control information. In some embodiments the implicit indicator that designates the one or more resource pools may be accomplished via scrambling or location within a frame.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

Only a few implementations and examples are described and other implementations, enhancements and variations can be made based on what is described and illustrated in this disclosure.

What is claimed is:

1. A communication method, comprising:
receiving, at a mobile station from a base station, a radio resource control (RRC) message that includes resource information corresponding to a plurality of resource pools and a mapping between a plurality of radio network temporary identifiers (RNTIs) and the plurality of resource pools; and
receiving, at the mobile station from the base station, a downlink control information (DCI) scrambled with a RNTI,
wherein the DCI indicates at least one designated resource pool from the plurality of resource pools and designated resources from within the at least one designated resource pool such that communications between the mobile station and a wireless device is permitted via a wireless link between the mobile station and the wireless device using the at least one designated resource pool.

2. The method of claim 1, wherein the resource information identifies at least one sub-frame and at least one resource block within the at least one sub-frame.

3. The method of claim 1, wherein the RRC message contains the plurality of RNTIs in a one-to-one correspondence with the plurality of resource pools.

4. The method of claim 1, wherein the DCI includes a cyclic redundancy check (CRC) sequence.

5. The method of claim 1, wherein the mobile station performs sidelink communication with the wireless device using the at least one designated resource pool.

6. An apparatus for wireless communication comprising a processor, configured to implement a method, comprising:
receive, at a mobile station from a base station, a radio resource control (RRC) message that includes resource information corresponding to a plurality of resource pools and a mapping between a plurality of radio network temporary identifiers (RNTIs) and the plurality of resource pools; and
receive, at the mobile station from the base station, a downlink control information (DCI) scrambled with a RNTI,
wherein the DCI indicates at least one designated resource pool from the plurality of resource pools and designated resources from within the at least one designated resource pool such that communications between the mobile station and a wireless device is permitted via a wireless link between the mobile station and the wireless device using the at least one designated resource pool.

7. The apparatus of claim 6, wherein the resource information identifies at least one sub-frame and at least one resource block within the at least one sub-frame.

8. The apparatus of claim 6, wherein the RRC message contains the plurality of RNTIs in a one-to-one correspondence with the plurality of resource pools.

9. The apparatus of claim 6, wherein the DCI includes a cyclic redundancy check (CRC) sequence.

10. The apparatus of claim 6, wherein the processor of the mobile station is configured to perform sidelink communication with the wireless device using the at least one designated resource pool.

11. A non-transitory computer readable medium having code stored thereon, the code, when executed by a processor, causing the processor to implement a method, comprising:
   receiving, at a mobile station from a base station, a radio resource control (RRC) message that includes resource information corresponding to a plurality of resource pools and a mapping between a plurality of radio network temporary identifiers (RNTIs) and the plurality of resource pools; and
   receiving, at the mobile station from the base station, a downlink control information (DCI) scrambled with a RNTI,
   wherein the DCI indicates at least one designated resource pool from the plurality of resource pools and designated resources from within the at least one designated resource pool such that communications between the mobile station and a wireless device is permitted via a wireless link between the mobile station and the wireless device using the at least one designated resource pool.

12. The non-transitory computer readable medium of claim 11, wherein the resource information identifies at least one sub-frame and at least one resource block within the at least one sub-frame.

13. The non-transitory computer readable medium of claim 11, wherein the RRC message contains the plurality of RNTIs in a one-to-one correspondence with the plurality of resource pools.

14. The non-transitory computer readable medium of claim 11, wherein the DCI includes a cyclic redundancy check (CRC) sequence.

15. The non-transitory computer readable medium of claim 11, wherein the mobile station performs sidelink communication with the wireless device using the at least one designated resource pool.

* * * * *